(12) United States Patent
Hutmacher

(10) Patent No.: US 8,511,271 B2
(45) Date of Patent: Aug. 20, 2013

(54) INTERNAL COMBUSTION ENGINE

(75) Inventor: Rolf Hutmacher, Remshalden (DE)

(73) Assignee: Daimler AG, Stuttgart (DE)

( * ) Notice: Subject to any disclaimer, the term of this patent is extended or adjusted under 35 U.S.C. 154(b) by 863 days.

(21) Appl. No.: 11/663,283

(22) PCT Filed: Sep. 16, 2005

(86) PCT No.: PCT/EP2005/009977
§ 371 (c)(1),
(2), (4) Date: Mar. 5, 2008

(87) PCT Pub. No.: WO2006/032410
PCT Pub. Date: Mar. 30, 2006

(65) Prior Publication Data
US 2009/0007879 A1  Jan. 8, 2009

(30) Foreign Application Priority Data
Sep. 21, 2004 (DE) .......................... 10 2004 045 634

(51) Int. Cl.
*F02B 3/06* (2006.01)
(52) U.S. Cl.
USPC ........................................ 123/193.6
(58) Field of Classification Search
USPC .................. 123/193.6, 294, 298, 262, 263
See application file for complete search history.

(56) References Cited

U.S. PATENT DOCUMENTS

| | | | |
|---|---|---|---|
| 4,377,967 A * | 3/1983 | Pelizzoni | 92/186 |
| 4,781,159 A * | 11/1988 | Elsbett et al. | 123/193.6 |
| 4,858,578 A | 8/1989 | Schereer et al. | |
| 5,029,563 A * | 7/1991 | Hu | 123/262 |
| 5,285,755 A * | 2/1994 | Regueiro | 123/193.6 |

(Continued)

FOREIGN PATENT DOCUMENTS

| | | |
|---|---|---|
| DE | 29 45 490 A1 | 5/1980 |
| DE | 196 49 052 A1 | 5/1998 |

(Continued)

OTHER PUBLICATIONS

"Die Thermodynamik des neuen Nutzfahrzeugmotors OM 904 LA von Mercedes-Benz", XP000582644, ISSN: 0024-8525, Apr. 1, 1996, No. 4, Stuttgart, Germany, (pp. 216-224).

(Continued)

*Primary Examiner* — M. McMahon
(74) *Attorney, Agent, or Firm* — Crowell & Moring LLP

(57) ABSTRACT

In an internal combustion engine having at least one cylinder, in which a combustion chamber is delimited between a piston and a cylinder head, a fuel injector, is arranged in the cylinder head and has an injection nozzle with a plurality of injection bores. A piston depression is arranged in the piston, and a compression projection, with a projection cone angle, is positioned opposite the injection nozzle in the piston depression. The injection bores are formed such that, during a fuel injection in a range from 20° CA before top dead center to 35° CA after top dead center, the fuel jets emerging from the injection bores with a fuel cone angle impinge on the piston depression and are guided by a piston depression surface. The injection bores and the compression projection are formed such that a generated ratio of fuel cone angle to projection cone angle is in a range between 0.95 and 1.36, so that the injected fuel mass is distributed uniformly within the piston depressions, and a mixture of fuel with combustion air is intensified.

9 Claims, 1 Drawing Sheet

(56) References Cited

U.S. PATENT DOCUMENTS

| | | | |
|---|---|---|---|
| 5,868,112 A * | 2/1999 | Mahakul et al. | 123/263 |
| 6,161,518 A * | 12/2000 | Nakakita et al. | 123/298 |
| 6,314,933 B1 * | 11/2001 | Iijima et al. | 123/193.6 |
| 6,640,772 B2 | 11/2003 | Gatellier et al. | |
| 6,732,703 B2 * | 5/2004 | Eckerle et al. | 123/298 |
| 7,096,848 B2 * | 8/2006 | Ono et al. | 123/294 |
| 7,213,564 B2 * | 5/2007 | Hill et al. | 123/298 |
| 7,472,678 B2 * | 1/2009 | Tsujimoto et al. | 123/299 |
| 7,654,240 B2 * | 2/2010 | Jarrett et al. | 123/193.6 |
| 2004/0182358 A1 | 9/2004 | Eckerle et al. | |
| 2006/0070603 A1 * | 4/2006 | Stanton et al. | 123/298 |

FOREIGN PATENT DOCUMENTS

| | | | |
|---|---|---|---|
| DE | 100 28 449 A1 | 7/2001 | |
| DE | 200 22 956 U1 | 8/2002 | |
| DE | 102 13 011 A1 | 10/2003 | |
| DE | 102 61 333 A1 | 1/2004 | |
| EP | 0 845 589 A1 | 6/1998 | |
| EP | 0 849 448 A1 | 6/1998 | |
| EP | 1 217 186 A2 | 6/2002 | |
| JP | 5 106442 A * | 10/1991 | 123/193.6 |
| JP | 5-106442 A | 4/1993 | |
| JP | 10184365 A | 7/1998 | |
| JP | 2002-147240 A | 5/2002 | |
| JP | 2002-227650 A | 8/2002 | |
| WO | WO 2004/057167 A1 | 7/2004 | |

OTHER PUBLICATIONS

Peter Kozuch, "Ein phaenomenologisches Modell zur kombinierten Stickoxid-und Russberechnung bei direkteinspritzenden Dieselmotoren", XP002353316, Nov. 5, 2004, (pp. I-XV) and (pp. 1-197).

International Search Report dated Nov. 24, 2005 with an English translation of the pertinent portions (Twelve (12) pages).

German Search Report dated Jun. 2, 2006 with an English translation of the pertinent portions (Five (5) pages).

Written Communication of the International Search Authority (Form PCT/ISA/237) (Supplementary Sheet) dated Jan. 2004 with an English translation of the pertinent portions (Eight (8) pages).

Japanese Office Action with English translation dated Dec. 21, 2010 (ten (10) pages).

Japanese Office Action mailed May 17, 2011.

Japanese language Office Action dated May 8, 2012(four (4) pages).

* cited by examiner

INTERNAL COMBUSTION ENGINE

BACKGROUND AND SUMMARY OF THE INVENTION

This invention relates to an auto-ignition, direct-injection internal combustion engine.

In direct-injection internal combustion engines with auto-ignition, in order to optimize combustion, use is made of different piston depression shapes which define the corresponding combustion chamber configuration and influence the combustion in the combustion chamber. This is intended to improve the mixture formation in the combustion chamber and therefore the formation of emissions in the exhaust gas. It is also possible to optimize the operation of an exhaust gas after treatment system arranged downstream.

A piston depression having a compression hump is known from German document DE 100 28 449 A1. The basic shape of the compression hump approximately forms a spherical cap. In the region of a maximum depression depth, the depression has an annular diameter which is less than half of the piston diameter. This is intended to make the piston suitable, as a result of its mechanical and thermal durability, for higher combustion pressures, so that it is possible to obtain higher levels of efficiency and power.

One object of the invention is the object of providing an auto-ignition internal combustion engine in which the mixture formation and the combustion in the combustion chamber are improved. This is achieved by means of a device having the features claimed.

According to a first embodiment, below a horizontal plane which is aligned with an uppermost part of the depression edge, the piston depression has a depression volume and is formed in such a way that a quotient of maximum depression depth divided by depression volume is in a range between 0.05 and 0.35, and in particular between 0.1 and 0.25. This provides an optimized design of the combustion chamber with regard to the fuel mass distribution in the available piston depression volume, so that sufficient oxygen proportions are available for combustion before and/or during the auto-ignition process. Soot particle formation is thereby minimized or largely impeded. The dimensions and ratios provided according to the invention form an adapted overall surface of the depression interior, by means of which the formation of fuel-rich zones within the depression volume according to the invention is almost completely avoided or considerably reduced. The effects surprisingly obtained with the ratios according to the invention are predominantly obtained as a result of the favorable trade-off between the intensive distribution of the fuel particles and in particular of the obtained mixture depth of the fuel droplets in relation to the depression volume.

According to a second embodiment, the piston depression is enclosed by an annular depression edge with a maximum depression diameter, and the piston has a piston diameter, and a ratio of piston diameter to maximum depression diameter is in a range between 1.05 and 1.4 or between 1.05 and 1.3. The ratio is preferably in a range from 1.1 to 1.2. This causes a remarkably fast propagation of the fuel mass within the piston depression, and therefore a rapid mixture of the fuel with the air. A fuel particle distribution is obtained which is matched to the piston diameter, which fuel particle distribution, according to the invention, permits an above-average propagation of fuel and therefore considerable mixture with the combustion air within the depression. The formation of fuel-rich zones at critical points in the combustion chamber is thereby reduced to a minimum.

According to a third embodiment, the injection bores and the compression projection are formed such that a generated ratio of fuel cone angle to depression angle is in a range between 0.95 and 1.36, and in particular between 1.15 and 1.3. The injected fuel mass is therefore distributed uniformly within the piston depression, and a mixture of fuel with combustion air is intensified. Accordingly, the provided ratio or the adaptation of the fuel cone angle to the depression angle provides a combustion chamber configuration which generates an adapted interaction within the piston depression between the depression contour profile and a fuel mass which emerges from the injection nozzle. If the projection is of conical design, then a cone angle is incorporated as a depression angle, wherein the projection can have other shapes, for example a spherical design. A tangent adjoining the projection with a corresponding angle of inclination can then be incorporated to determine the depression angle.

The effects obtained are to be predominantly attributed to a favorable trade-off between the angle at which the fuel particles impinge on the depression, and the obtained penetration depth of the fuel droplets in relation to the depression angle. This makes it possible to obtain sufficient mixture of the fuel droplets with the combustion air. The distribution of the injected fuel within the piston depression and the subsequent mixture with the combustion air therefore takes place before the initiation of undesired soot particle formation, in particular during full-load operation.

According to a further embodiment of the invention, the piston depression has a diameter in the depression base at a maximum depression depth, and a ratio of the diameter at the maximum depression depth to the piston diameter is in a range between 0.22 and 0.45, and in particular between 0.3 and 0.39. According to the invention, flow conditions which are adapted to the piston diameter are formed in the proposed range, which flow conditions permit a fast and sufficient mixture of the fuel jets with combustion air in the lower depression region. Turbulent flow movements are therefore obtained which largely prevent the formation of fuel-rich zones in the lower depression range.

In a further embodiment of the invention, a piston depression contour has a depression base radius between the depression base and the depression edge, and a ratio of depression base radius to maximum depression diameter is in a range between 0.1 and 0.35, and in particular between 0.16 and 0.22. This ensures uniform and controlled guidance of the fuel particles along the piston depression base. This then leads, in a targeted fashion, to more intense mixture of the fuel with the combustion air. In addition, a sufficient contact surface is provided, which is adapted to the piston depression size, between the combustion air and the fuel jets sliding on the depression base.

According to a further embodiment of the invention, the piston depression contour has a projection radius between the compression projection and the depression base, and a ratio of projection radius to maximum depression diameter is in a range between 0.45 and 1.1. As a result, the fuel particles impinging on the depression base are accelerated in such a way that the fuel particles are guided on to oxygen-rich zones in order to prevent an undesired concentration of fuel-rich zones in the depression base region.

According to a further embodiment of the invention, the compression projection is formed such that the highest compression projection region is spaced apart from the piston head by a minimum compression spacing, and a ratio of minimum compression spacing to maximum depression depth is in a range between 0.1 and 0.45, in particular between 0.15 and 0.25. A free space which is adapted to the depression depth is thereby provided between the injection nozzle and the compression projection, which free space serves to minimize the formation of fuel-rich zones in the region of the compression projection. The coordinated ratios proposed according to the invention provide favorable flow conditions which permit a required supply of air or oxygen to the fuel-rich zones in the region of the compression projection and of the piston depression base.

Further advantages can be gathered from the following description and the associated drawings. Exemplary embodiments of the invention are illustrated in the drawings.

DETAILED DESCRIPTION OF THE INVENTION

Figure 1:
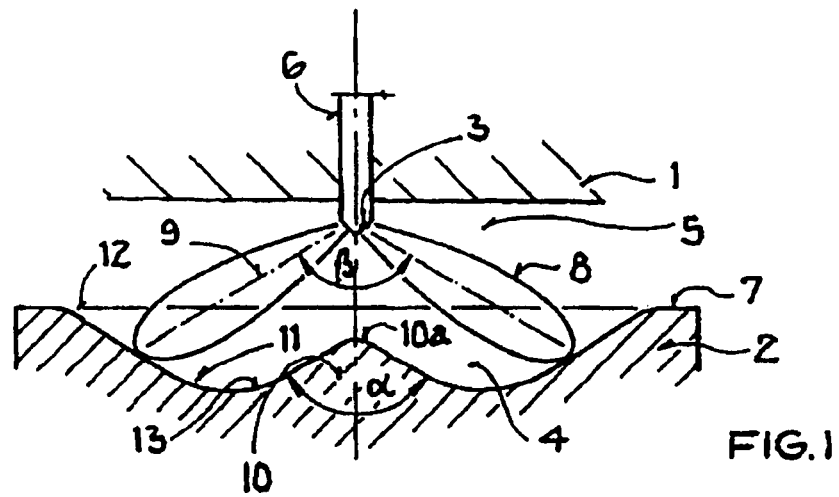
FIG. 1 is a schematic illustration of a combustion chamber configuration according to the invention of an internal combustion engine with auto-ignition.

FIG. 1 depicts an internal combustion engine which has at least one cylinder (not illustrated) and a cylinder head 1. Within the cylinder, a combustion chamber 5 is delimited between a piston 2 and the cylinder head 1. A fuel injector 6 having an injection nozzle 3 with a plurality of injection bores (not illustrated) is arranged in the cylinder head 1. A plurality of fuel jets emerge from the injection bores, with the injection nozzle 3 having five to nine, and preferably six to eight, injection bores. As a result, the fuel is injected in a corresponding number of fuel jets 8 directly into the combustion chamber 5, so as to provide a direct-injection internal combustion engine. A diesel fuel is preferably injected into the combustion chamber 4, so that an auto-ignition combustion process is initiated. A fuel cone angle $\beta$ formed between the fuel jets is in a range between 50° and 160°.

Figure 2:
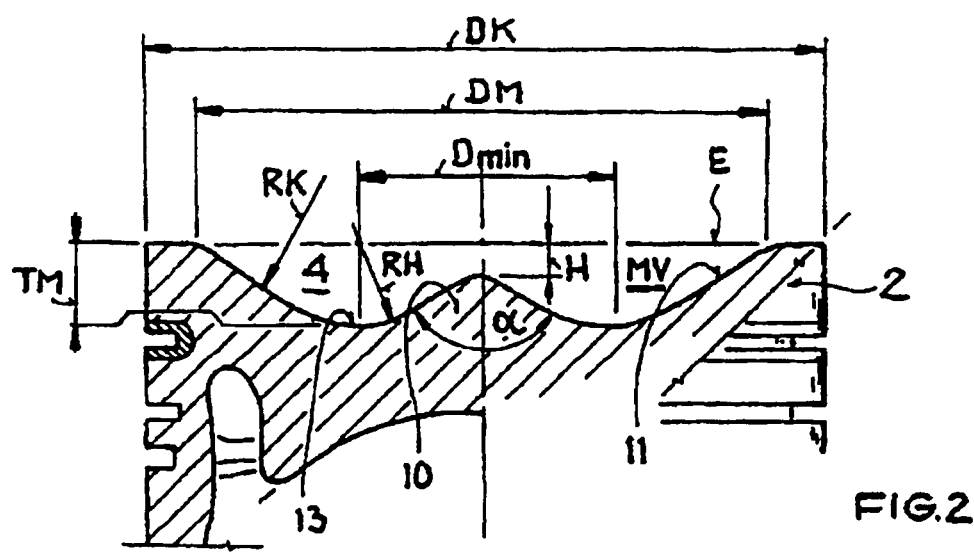
FIG. 2 is a schematic illustration of a cross sectional view of a piston of the internal combustion engine shown in FIG. 1.

A piston depression 4 which is formed in the piston head 7 is situated on that side of the piston 2 which faces towards the cylinder head 1, and is outwardly delimited by an annular depression edge 12. The piston 2 has a piston diameter DK, with the piston depression having a depression volume MV below a plane E which is aligned with an upper depression edge surface. In the case of a flat piston head 7 which adjoins the depression edge 12 as shown in FIG. 2, the plane E is formed as a horizontal face which is congruent with the piston head 7. Depending on the profile of the depression edge 12, the plane E can nevertheless lie above the piston head 7 or below the piston head 7.

As can be seen in FIG. 1, the piston depression 4 has an approximately centrally positioned compression projection 10 which extends in the direction of the cylinder head 1. The projection 10, which is preferably formed in the shape of a conical elevation, has a projection cone angle $\alpha$ which is referred to in the following as the depression angle. The elevation 10 which is formed is not restricted to a conical structure. It can also be formed differently, for example as a spherical projection. According to FIG. 2, the depression contour 11 extends, as seen from the compression projection 10, in the direction of a depression base 13 and then further in the direction of the depression edge 12. A depression edge is to be understood as the end or the outermost region, in which the surface of the piston head 7 begins, of the piston depression 4. The piston head surface 7 directly adjoins the depression edge 12.

According to FIG. 2, the injection nozzle 6 is arranged above the piston depression 4 which is formed in the piston head 7, with the piston depression 4 again being arranged centrally in the combustion chamber 5 of the internal combustion engine. The basic plate-like depression shape has a rounded-off transition to the piston head 7 in the edge region of the piston depression 4 in order to avoid accumulations of fuel. A spacing H is provided between the upper projection region 10a and the piston head 7. A sufficient free space remains as a result of the provided spacing H, so that the fuel quantity deflected in the direction of the projection 10 can be well distributed. The proportion of the fuel deflected in the direction of the depression edge 12 is determined by the design of the piston depression 4 and its dimensions in relation to the piston diameter DK. The ratios are to be selected such that a formation of fuel-rich zones is avoided in order to suppress soot particle formation.

By way of a combustion chamber configuration according to the invention, it is an aim of the invention to inject the fuel jets, which are introduced into the combustion chamber 5, in a manner adapted to the piston depression contour 11. The fuel mass is thereby guided within the piston depression 4, and is simultaneously intensively mixed with the compressed combustion air, by means of the depression design according to the invention. It is also sought by means of the proposed combustion chamber configuration to avoid any possible generation of fuel-rich zones within the piston depression 4, so that the auto-ignition combustion process can take place with the least possible soot particle formation. This is particularly advantageous at operating points with high fuel masses, for example in full-load operation, in order to permit largely soot-particle-free exhaust gases during operation of the internal combustion engine, in particular in upper speed and load ranges.

According to a first embodiment of the invention, the piston depression 4 is formed in such a way that a quotient TM/MV of maximum depression depth TM divided by depression volume MV is in a range between 0.05 and 0.35. In order to highly advantageously configure the fuel distribution conditions and mixture conditions within the depression within the context of the invention, the quotient TM/MV is to be selected between 0.1 and 0.25, since it is possible with the provided quotient between 0.1 and 0.25 to obtain surprising effects as a result of an excellent trade-off between the intensive distribution of the fuel particles and in particular the obtained mixture depth of the fuel droplets in relation to the depression volume.

According to a second advantageous embodiment of the invention, the annular depression edge 12 has a maximum depression diameter DM, and a ratio DK/DM of piston diameter DK to maximum depression diameter DM is in a range between 1.05 and 1.4 or between 1.05 and 1.3. This ratio is preferably between 1.1 and 1.2. This provides, in the combustion chamber 5, a fuel distribution which is adapted to the piston diameter and, according to the invention, permits a sufficient propagation of fuel and therefore a good mixture with the combustion air within the depression.

FIG. 1 depicts the fuel injection jets 8 which are generated when the piston 2 is approximately at top dead center TDC. The injection jets 8 are each illustrated schematically as axes of an injection cone 9 within the combustion chamber 5. In particular when the fuel injection takes place in a range from 20° CA before top dead center TDC to 35° CA after top dead center TDC, the fuel jets emerging from the injection bores with a fuel cone angle $\beta$ impinge on the piston depression 4 and mix with the combustion air within the piston depression 4. In order to obtain soot-free combustion, the injection bores and the compression projection 10 are formed such that a generated ratio $\beta/\alpha$ of fuel cone angle $\beta$ to depression angle $\alpha$ is in a range between 0.95 and 1.36. A sufficient and intensive mixture is obtained in particular at a ratio β/α of from 1.15 to 1.3. The manner in which the distribution of fuel takes place is significant in obtaining a sufficient mixture. The point at which the injection jet 8 impinges on the depression surface 11, and therefore the mixture conditions within the depression 4, is determined by the above described ratios of β/α.

In order to further optimize the design of the piston depression 4 with regard to soot-free combustion, a piston depression contour 11 has a depression base radius RK between the piston depression 13 and the depression edge 12, which depression base radius RK is formed such that a ratio RK/DM of depression base radius RK to maximum depression diameter DM is in a range between 0.1 and 0.35. The ratio RK/DM is preferably between 0.16 and 0.22, in order to thereby intensify the positive effect on the mixture of the fuel with the air. In order to further impede the formation of soot particles during combustion, the piston depression contour 11 has a projection radius RH between the compression projection 10 and the depression base 13, wherein a ratio RH/DM of projection radius RH to maximum depression diameter DM is in a range between 0.45 and 1.1.

In order to also suppress the formation of fuel-rich zones in the combustion chamber 5, the compression spacing H, by which the highest compression projection region 10a is spaced apart from the piston head 7, is selected such that a ratio H/TM of compression spacing H to maximum depression depth TM is in a range between 0.1 and 0.45, in particular between 0.15 and 0.25.

According to a further preferred embodiment of the invention, in order to further reduce the formation of soot particles in the region of the depression base 13, a ratio Dmin/DK of a diameter Dmin at the maximum depression depth to the piston diameter DK is selected to be in a range from 0.22 to 0.45 or from 0.22 to 0.39. It has been proven that a very low degree of soot particle formation is obtained at a ratio Dmin/DK in a range between 0.3 and 0.39.

The internal combustion engine according to the invention preferably operates according to the four-stroke principle. The combustion chamber configuration according to the invention is nevertheless likewise suitable for internal combustion engines which are operated according to the two-stroke principle. In a 4-stroke process, one stroke corresponds to a full piston stroke. The working cycle of the internal combustion engine composed of four strokes corresponds to one combustion cycle, with a combustion cycle beginning with a first intake stroke, in which the piston 2 moves downwards to bottom dead center. The current position of the piston 2 relative to the cylinder head 1 is determined by the crank angle CA relative to top dead center TDC.

In the intake stroke, combustion air is supplied to the combustion chamber 5, with the piston 2 moving upwards in the direction of the cylinder head 1 in a subsequent compression stroke and thereby compressing the intake air. The charge exchange in the combustion chamber 5 takes place via gas exchange valves and gas ducts (not illustrated) arranged in the cylinder head 1. The end of the compression process is reached when top dead center TDC is reached in the cylinder head.

The fuel injection preferably takes place in a range from 20° C.A before TDC to 35° CA after TDC. The combustion chamber configuration according to the invention in connection with the above-listed ratios, which can be arbitrarily combined with one another within the context of the invention, result in a depression depth which is adapted to the depression volume, and a free fuel jet length which is adapted to the depression contour profile. This generates an optimum contact surface of the fuel jets 8 with the combustion air, so that a positive interaction is obtained between the fuel quantity deflected onto the piston depression surface 11 and the combustion air. This then leads to an additional capture of air and to a sufficient and uniform distribution of the fuel in the combustion chamber despite a low-swirl combustion process. During the fuel injection, the fuel particles mix with the combustion air, and the combustion is initiated by means of an auto-ignition process. Here, the piston moves down again in a third expansion stroke. The exhaust gases are subsequently forced out of the combustion chamber 5 in a final exhaust stroke.

The invention claimed is:

1. An internal combustion engine comprising:
at least one cylinder, in which a combustion chamber is delimited between a piston and a cylinder head,
a fuel injector arranged in the cylinder head and having an injection nozzle with a plurality of injection bores, and
a piston depression arranged in the piston and having a compression projection, with a projection cone angle, positioned in the piston depression opposite the injection nozzle,
wherein the injection bores are formed such that, during fuel injection which takes place in a range from 20° CA before top dead center to 35° after top dead center, fuel jets emerging from the injection bores with a fuel cone angle impinge on the piston depression,
wherein, to impede soot particle formation, the injection bores and the compression projection are formed such that a generated ratio β/α of fuel cone angle β to projection cone angle α is in a range of from 1.15 to 1.3,
wherein said piston depression has a piston depression contour with a depression base radius RK between a depression base and a depression edge,
wherein said depression base radius RK has a radius center disposed outside of the piston depression, and
wherein a ratio RK/DM of the depression base radius RK to a maximum depression diameter DM of said piston depression is in a range of from 0.1 to 0.35 so as to further impede soot particle formation, the piston depression having a rounded-off transition to a flat piston head surface in an edge region of the piston depression.

2. The internal combustion engine as claimed in claim 1, wherein the piston has a piston diameter DK, and wherein a ratio DK/DM of the piston diameter DK to the maximum depression diameter DM is in a range of from 1.05 to 1.4.

3. The internal combustion engine as claimed in claim 2, wherein the ratio DK/DM is in a range of from 1.1 to 1.2.

4. The internal combustion engine as claimed in claim 1, wherein the piston depression has a depression base with a maximum depression depth, and wherein a ratio Dmin/DK of a diameter Dmin at the maximum depression depth to a piston diameter DK is in a range of from 0.22 to 0.45.

5. The internal combustion engine as claimed in claim 4, wherein the ratio Dmin/DK is in a range of from 0.3 to 0.39.

6. The internal combustion engine as claimed in claim 1, wherein the ratio RK/DM is in a range of from 0.16 to 0.22.

7. The internal combustion engine as claimed in claim 1, wherein the piston depression contour has a projection radius RH between the compression projection and the depression base, and wherein a ratio RH/DM of the projection radius RH to the maximum depression diameter DM is in a range of from 0.45 to 1.1.

8. The internal combustion engine as claimed in claim 1, wherein the compression projection is formed such that a highest compression projection region is spaced apart from a piston head by a compression spacing H, and wherein a ratio H/TM of the compression spacing H to a maximum depression depth TM is in a range of from 0.1 to 0.45.

9. The internal combustion engine as claimed in claim 8, wherein the ratio H/TM is in a range of from 0.15 to 0.25.

\* \* \* \* \*